(12) United States Patent
Tatsumi

(10) Patent No.: US 8,896,766 B2
(45) Date of Patent: Nov. 25, 2014

(54) DISPLAY APPARATUS, LIGHT EMITTING DEVICE, AND METHOD FOR CONTROLLING DISPLAY APPARATUS

(71) Applicant: Canon Kabushiki Kaisha, Tokyo (JP)

(72) Inventor: Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/047,816

(22) Filed: Oct. 7, 2013

(65) Prior Publication Data

US 2014/0104439 A1    Apr. 17, 2014

(30) Foreign Application Priority Data

Oct. 16, 2012   (JP) ................................. 2012-228954

(51) Int. Cl.
*H04N 3/14* (2006.01)
*H04N 17/00* (2006.01)
*G09G 3/34* (2006.01)

(52) U.S. Cl.
CPC ............. *H04N 17/00* (2013.01); *G09G 3/3406* (2013.01)
USPC ........... 348/790; 348/688; 348/447; 348/607; 345/102; 345/87

(58) Field of Classification Search
CPC .................. H04N 7/012–3/3426; G09G 3/36; G09G 3/34; G09G 3/3406–3/3426
USPC ......... 348/441–459, 618–623, 790–793, 801, 348/687, 688; 345/102, 87–90
See application file for complete search history.

(56) References Cited

U.S. PATENT DOCUMENTS

2005/0184952 A1*   8/2005   Konno et al. ................. 345/102
2012/0092388 A1*   4/2012   Kamon ......................... 345/690

FOREIGN PATENT DOCUMENTS

| JP | 2009-122552 A | 6/2009 |
| JP | 2009-251069 A | 10/2009 |
| JP | 2011-013558 A | 1/2011 |
| JP | 2011-022462 A | 2/2011 |

* cited by examiner

*Primary Examiner* — Michael Lee
(74) *Attorney, Agent, or Firm* — Canon U.S.A., Inc. IP Division

(57) ABSTRACT

A display apparatus that displays an image by causing a light emitting device to emit light includes a detection unit configured to detect flicker information that indicates a likelihood of occurrence of a flicker based on input image information, and a control unit configured to control both a light emission luminance and a duty ratio of a light emission time of the light emitting device according to the flicker information detected by the detection unit.

14 Claims, 18 Drawing Sheets

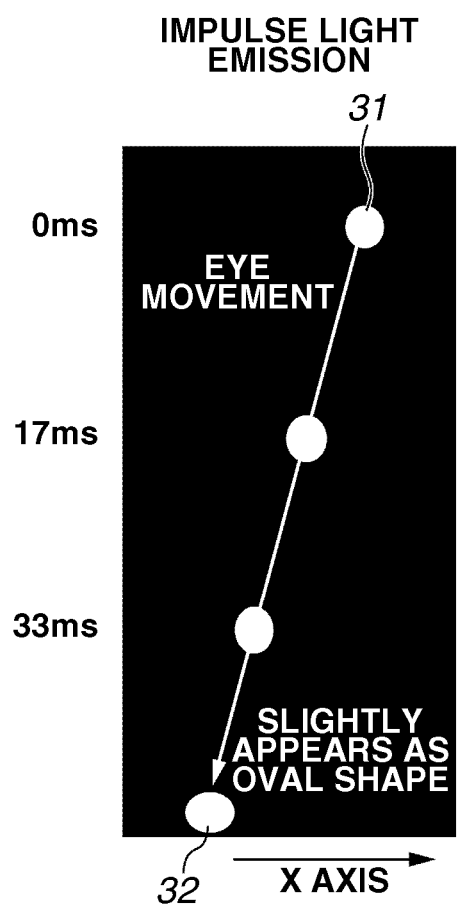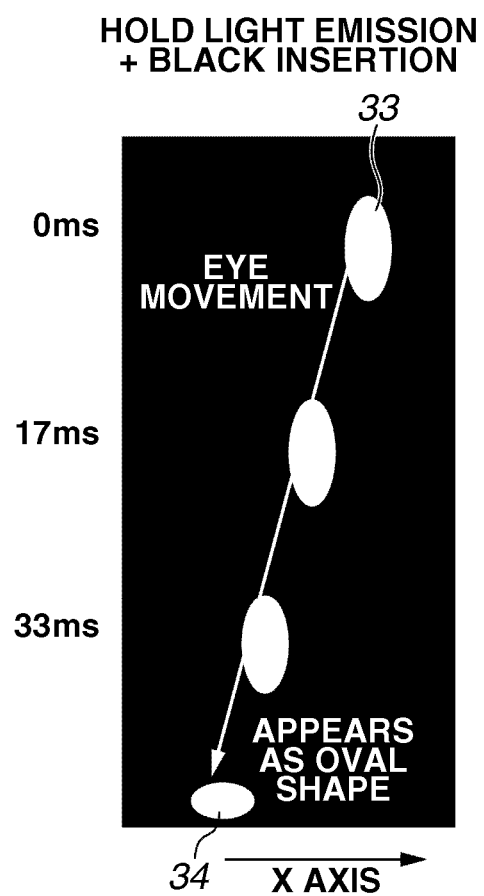

FIG.3A1
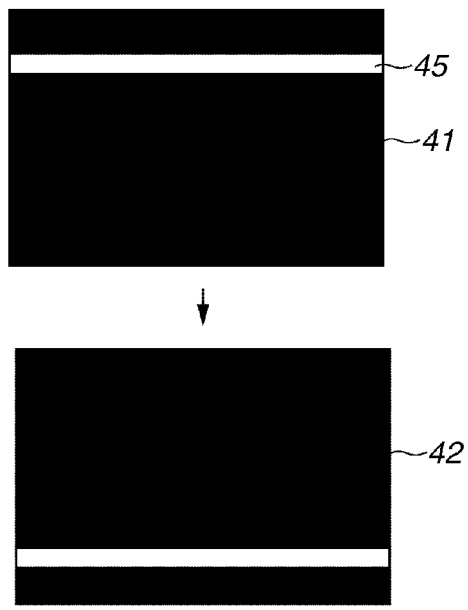
FIG.3B1
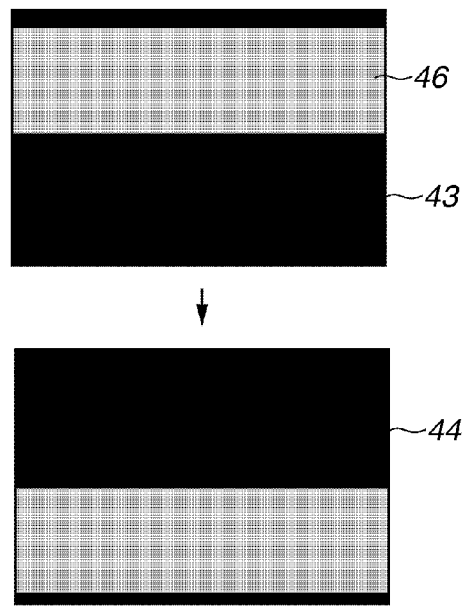
FIG.3A2
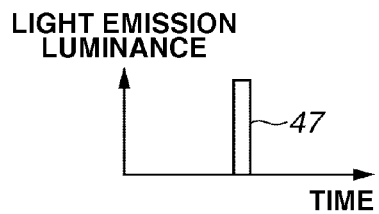
FIG.3B2
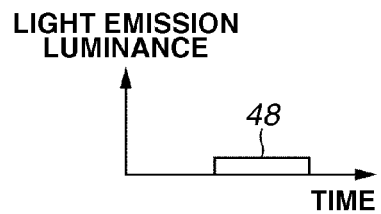

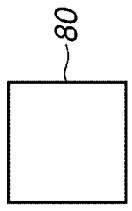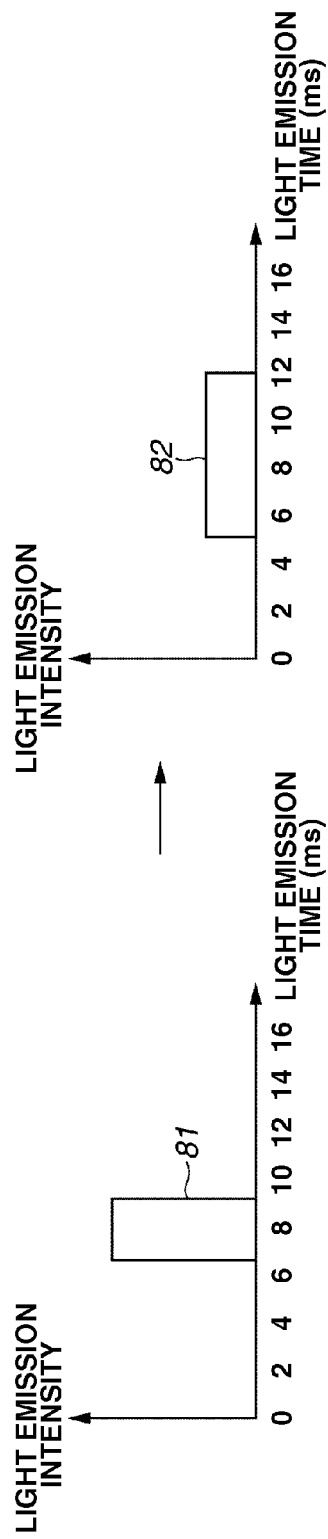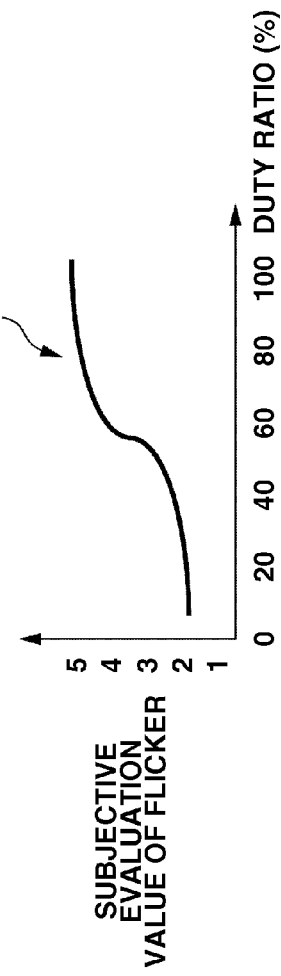

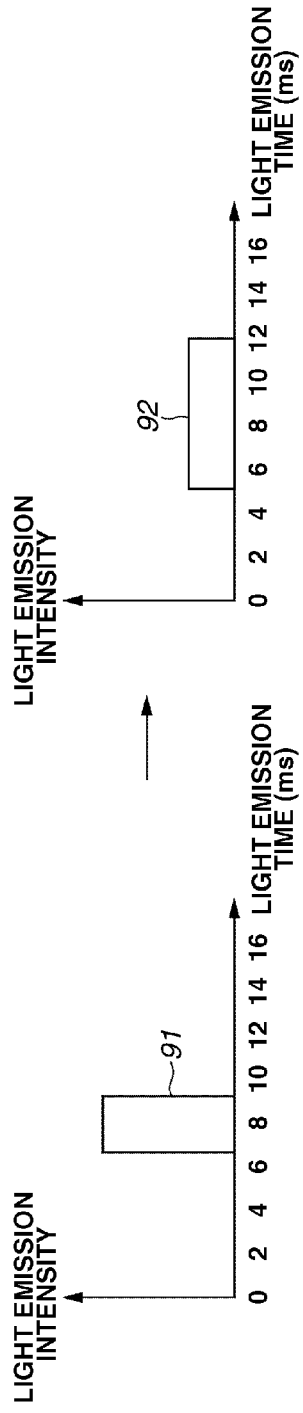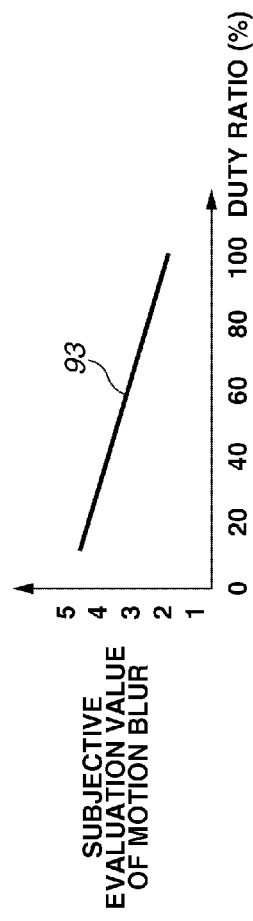

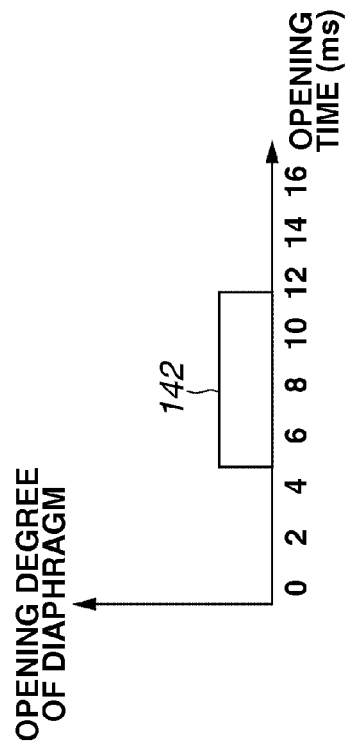
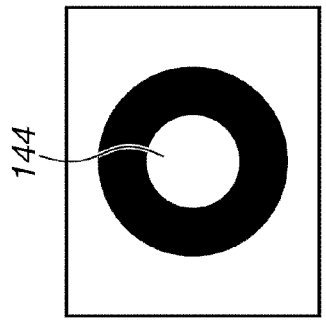
FIG.14B1  FIG.14B2
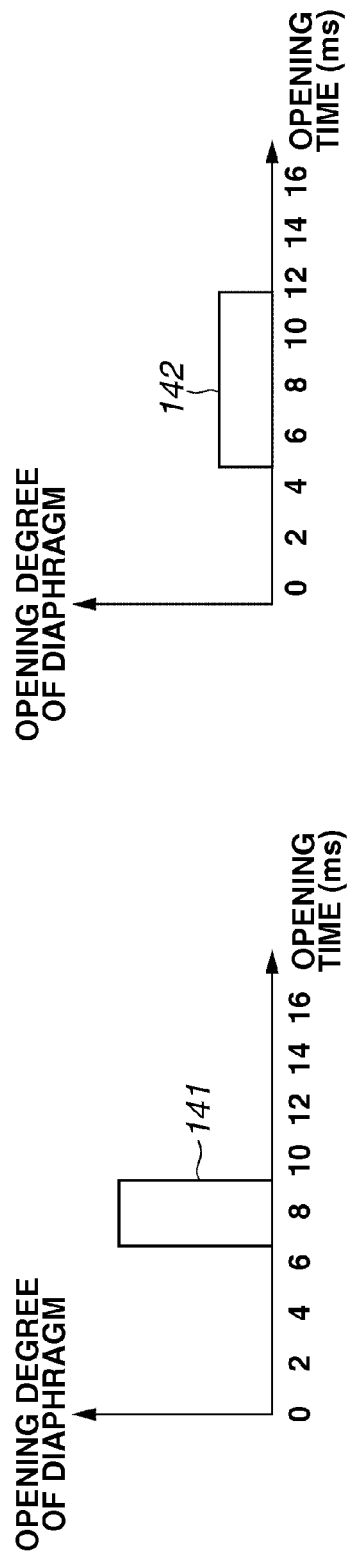
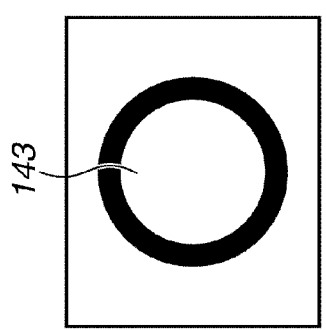
FIG.14A1  FIG.14A2

FIG.17A1
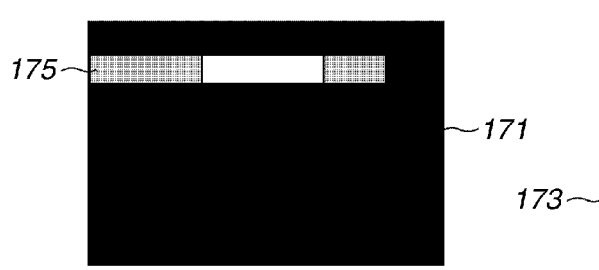
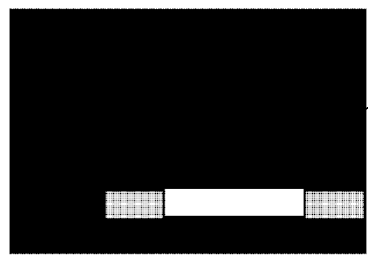
FIG.17B1
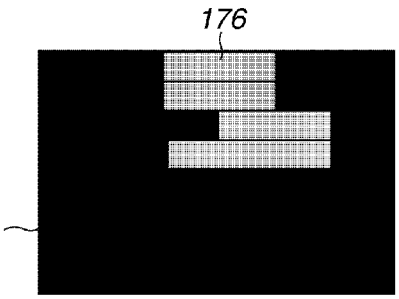
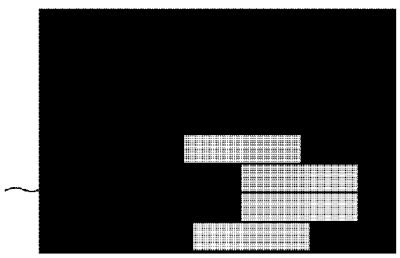
FIG.17A2
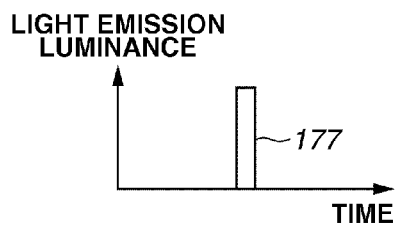
FIG.17B2
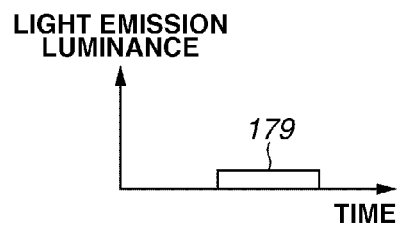
FIG.17A3
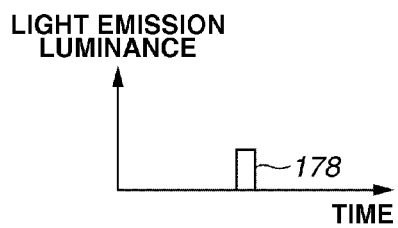
FIG.17B3
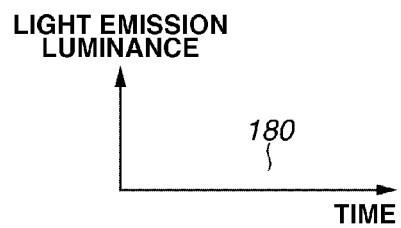

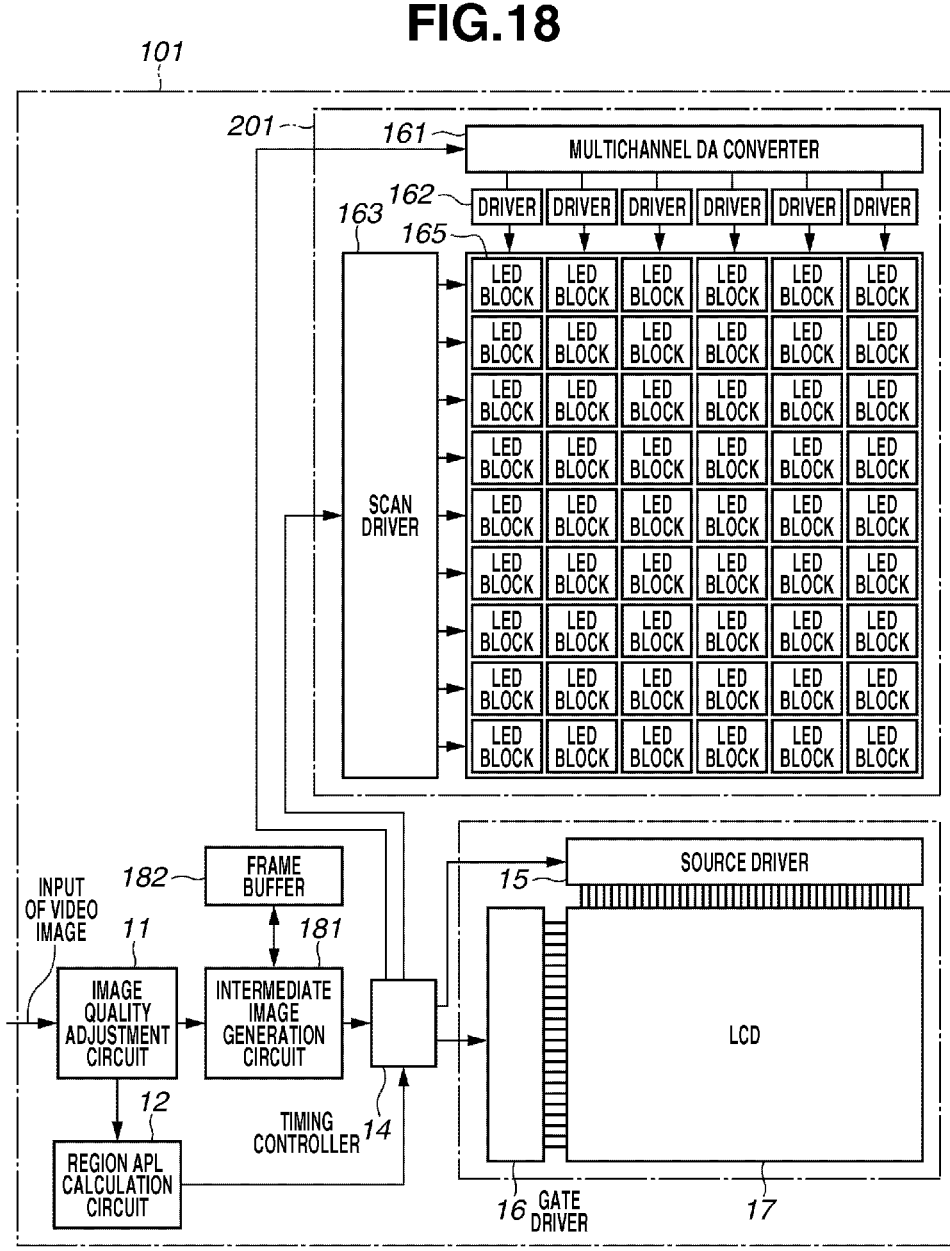

DISPLAY APPARATUS, LIGHT EMITTING DEVICE, AND METHOD FOR CONTROLLING DISPLAY APPARATUS

BACKGROUND OF THE INVENTION

1. Field of the Invention

The present invention relates to, for example, a display apparatus configured to display an image on a hold-type display device such as a liquid crystal panel by causing a light emitting device to emit light. The present invention can be applied to a master monitor, a picture monitor, and the like for checking an image, which are required to, for example, display an input image without multiplying a frame frequency of the input image by a constant factor.

2. Description of the Related Art

Conventionally, display apparatuses using a liquid crystal panel and the like have had such a problem that displaying a moving video image results in occurrence of an image lag feeling hereinafter referred to as a motion blur. One commonly taken measure against it is to display an image while multiplying a frame frequency of 60 Hz or 50 Hz by a constant factor, and reduce a hold time to eliminate an influence of a motion blur due to the hold time.

Multiplying a frame frequency by a constant factor requires generation of an intermediate image to display an image in a new frame. However, there is such a problem that, if an original video image contains an image of a stripe pattern and the like, an error occurs in generation of the intermediate image, as a result of which a viewer feels as if the video image is interrupted.

On the other hand, reducing the hold time without changing a frame frequency of 60 Hz or 50 Hz to reduce a motion blur raises a problem of occurrence of a flicker, thereby disturbing visibility.

Particularly in master monitors and picture monitors used for checking a video image, the hold time is fixed to a value of about 50% as a ratio (a duty ratio) during one frame time. The fixed duty ratio leads to occurrence of a motion blur in a quickly moving portion depending on a video image, and occurrence of a flicker in a bright image, but viewers use them while bearing with such a disturbance.

Therefore, it is required to minimize occurrence of a motion blur and a flicker without changing a frame frequency of 60 Hz or 50 Hz.

For example, as discussed in Japanese Laid-Open Patent Application Nos. 2011-22462 and 2011-13558, there is a technique for detecting a motion vector and controlling a hold time according to the detected motion vector.

Further, as discussed in Japanese Laid-Open Patent Application Nos. 2011-13558 and 2009-122552, there is a technique for controlling a hold time according to an image quality mode and a genre of a content.

Further, as discussed in Japanese Laid-Open Patent Application No. 2009-251069, there is a technique for controlling a hold time according to a luminance level of a partial region in a display, which enables reduction in occurrence of a flicker.

However, controlling the hold time according to the motion vector has such a problem that a flicker suddenly occurs at the moment that an object moves in a bright image. Further, the method for controlling the hold time according to the image quality mode and the genre of the content has such a problem that the method cannot be used for the master monitors, the picture monitors, and the like, on which image qualities of all contents need to be checked under a fixed mode. Further, the above-described conventional techniques share such a problem in common that a change in the hold time results in a change in a luminance, and the luminance change is corrected by applying a gain to a video image to maintain a constant luminance, which leads to an adverse influence on the image quality.

For example, the master monitors, the picture monitors, and the like are set in such a manner that a gamma curve has a continuous rise from a base luminance when a black signal is inserted. Further, the master monitors, the picture monitors, and the like are provided with some measure for facilitating an image quality check in a low gradation portion, such as linearization of a gamma curve in the low gradation portion. Therefore, a change in the gain for a video image during the video image causes a change in the luminance in the low gradation portion in the middle of the video image, disturbing a delicate work of the image quality check. Further, the change in the gain also causes a change in a peak luminance, providing different visibility of a high gradation portion in the video image. Therefore, normally, for the master monitors, the picture monitors, and the like, a fixed value is used as the gain without changing it.

SUMMARY OF THE INVENTION

The present invention is directed to a display apparatus capable of reducing occurrence of a flicker and occurrence of a motion blur even when a fixed value is used as a gain applied to a video image.

According to an aspect of the present invention, a display apparatus that displays an image by causing a light emitting device to emit light includes a detection unit configured to detect flicker information that indicates a likelihood of occurrence of a flicker based on input image information, and a control unit configured to control both a light emission luminance and a duty ratio of a light emission time of the light emitting device according to the flicker information detected by the detection unit.

Further features of the present invention will become apparent from the following description of exemplary embodiments with reference to the attached drawings.

BRIEF DESCRIPTION OF THE DRAWINGS

FIGS. 2A and 2B each illustrate how a video image is viewed.

FIGS. 3A1 and 3A2, and FIGS. 3B1 and 3B2 illustrate light emission states of a light emitting device according to the first exemplary embodiment.

FIGS. 8A, 8B, and 8C illustrate an experiment about a relationship between a light emission luminance and a light emission time of a display patch and the subjective evaluation of a flicker.

FIGS. 9A, 9B, and 9C illustrate an experiment about a relationship between a light emission time of a display patch and a subjective evaluation of a motion blur.

FIGS. 14A1 and 14A2, and FIGS. 14B1 and 14B2 illustrate control of a diaphragm of the liquid crystal projector.

FIGS. 17A1, 17A2, and 17A3, and FIGS. 17B1, 17B2, and 17B3 illustrate an example of control of a backlight according to the fourth exemplary embodiment.

FIG. 18 illustrates an internal configuration of a display apparatus according to a fifth exemplary embodiment.

DESCRIPTION OF THE EMBODIMENTS

Figure 1:
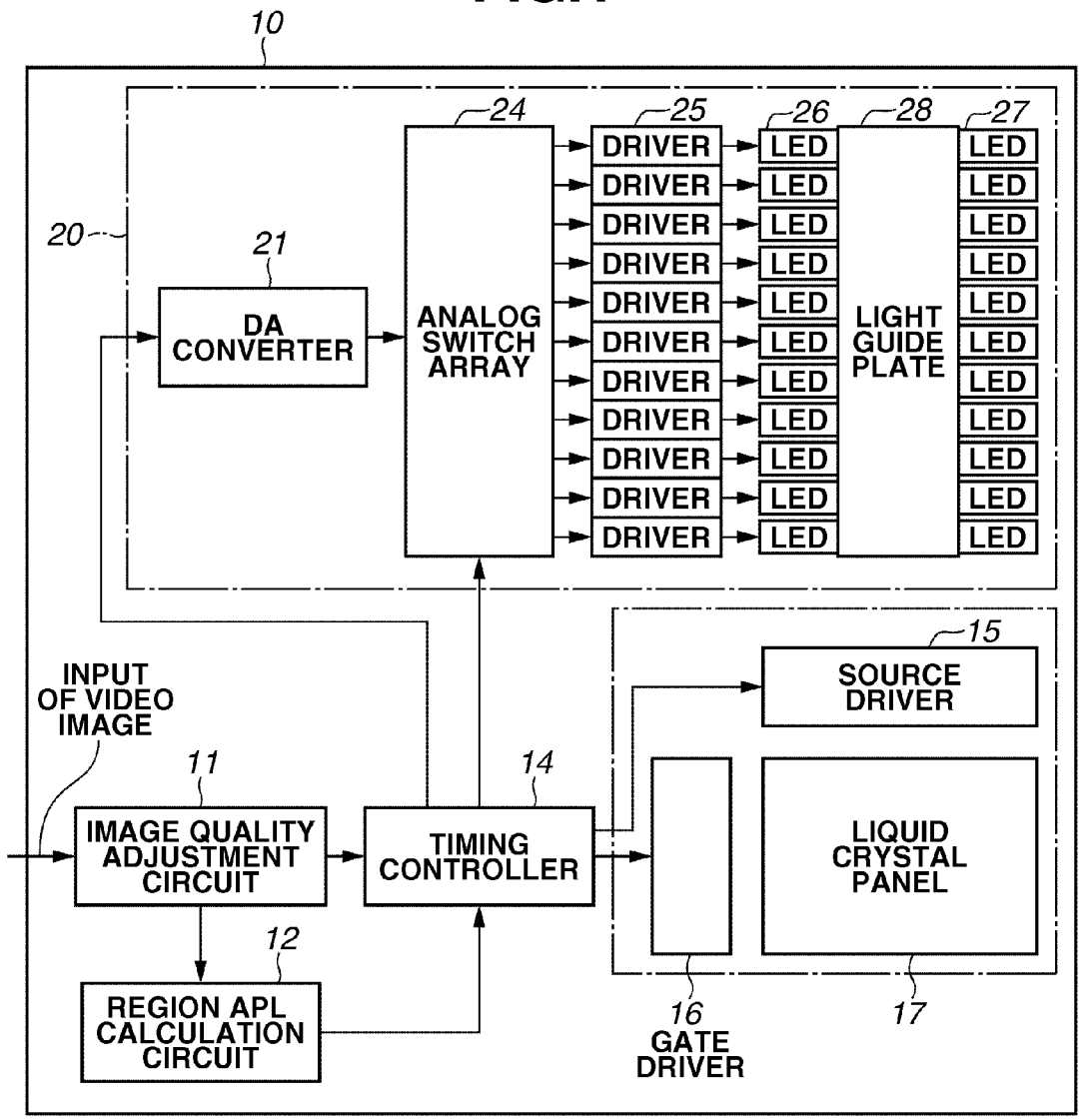
FIG. 1 illustrates an internal configuration of a display apparatus according to a first exemplary embodiment.

Various exemplary embodiments, features, and aspects of the invention will be described in detail below with reference to the drawings.

First, how a video image is viewed will be described with reference to FIGS. 2A and 2B. FIGS. 2A and 2B illustrate a comparison in how a video image is viewed.

FIG. 2A illustrates how a video image is viewed when it is displayed at a frame frequency of 60 Hz with impulse light emission.

FIG. 2B illustrates how a video image is viewed when it is displayed at a frame frequency of 60 Hz with hold light emission while black data is inserted.

In each drawing, a displayed object is spherical, and is moving from the right side to the left side in each frame. In each drawing, a vertical axis represents a time, and a frame is switched every 16.67 ms for the video image at a frame frequency of 60 Hz. An eye movement is indicated by an arrow. An image combined along the eye movement (an image viewed by a viewer) is indicated at the bottom of each drawing.

In FIG. 2A, the video image of the sphere is viewed as a shape 31 in one frame by impulse light emission. The video image of the sphere is viewed as a shape 32 in a combination of several frames by impulse light emission.

In FIG. 2B, the video image of the sphere is viewed as a shape 33 in one frame by hold light emission. The video image of the sphere is viewed as a shape 34 in a combination of several frames by hold light emission.

In FIG. 2A, only the original image is displayed in each frame by impulse light emission. Each of the images is viewed almost as a spherical shape as indicated by the shape 31. The image viewed in the combination of the several frames is almost spherical as indicated by the shape 32. Therefore, such display method provides the best visibility for a movement of an object. However, a flicker significantly occurs in the display at a frame frequency of 60 Hz with impulse light emission, whereby the image cannot be displayed brightly in that case.

In FIG. 2B, only the original image is displayed in each frame by hold light emission. The time during which light is emitted increases as indicated by the shape 33 (hold-type light emission display). As a result of combining several frames of the image along the direction of the eye movement, the image is viewed as a shape deformed into an oval shape as indicated by the shape 34. The image is deformed, although its degree is comparatively improved due to the black insertion and a reduction in the hold time approximately to a half. Further increasing the time of the black insertion can prevent the deformation. However, conversely, such display method becomes to resemble impulse light emission, and, therefore, provides an effect similar to the display method illustrated in FIG. 2A, leading to significant occurrence of a flicker.

Therefore, it can be understood that it is desirable to dynamically change the hold time according to a video image.

In the following description, a first exemplary embodiment will be described.

FIG. 1 illustrates an internal configuration of a display apparatus according to the first exemplary embodiment. The display apparatus 10 includes a light emitting device (backlight device) 20. The light emitting device 20 operates based on a scan method, according to which a plurality of LEDs 26 and 27 is caused to emit light in the order that they are arranged. An image quality adjustment circuit 11 adjusts an image quality of an input video image according to the display apparatus 10 and a viewer setting. A region average picture level (APL) calculation circuit 12 calculates an APL value for each region. The region APL calculation circuit 12 corresponds to an example of a detection unit configured to detect flicker information that indicates a likelihood of occurrence of a flicker. A timing controller 14 controls timings of a panel module and a backlight module. The timing controller 14 corresponds to an example of a control unit.

The display apparatus 10 further includes a source driver 15 for driving a liquid crystal panel 17, and a gate driver 16 for driving the liquid crystal panel 17. The liquid crystal panel 17 serves as a spatial modulation element. The liquid crystal panel 17 is a display unit, and corresponds to an example of a hold-type display device. A digital-to-analog (DA) converter 21 determines currents when the LEDs 26 and 27 are caused to emit light. An analog switch array 24 switches ON/OFF states of the LEDs 26 and 27. Drivers 25 drive the LEDs 26 and 27. The LEDs 26 serve as light emitting units vertically aligned so as to form a single line at the left side. The LEDs 27 serve as light emitting units vertically aligned so as to form a single line at the right side. A light guide plate 28 guides light emitted from each of the left and right LEDs 26 and 27 in a streak manner.

Next, an outline of an operation of the display apparatus 10 will be described.

The image quality adjustment circuit 11 adjusts an image quality of a video signal (luminance component (Y)/blue chrominance (Pb)/red chrominance (Pr) signal) input into the display apparatus 10 using a characteristic of the liquid crystal panel 17 and a preference of a viewer as parameters to generate an optimum image, and then outputs it as a red (R)/green (G)/blue (B) signal. The RGB signal is output to the region APL calculation circuit 12 and the timing controller 14. The region APL calculation circuit 12 divides a display region approximately into 9 to 50 blocks according to a screen size of the liquid crystal panel 17, and calculates an APL value for each block. The APL value means an average picture level, and is a value calculated by averaging gradation numbers in an image to be displayed. The region APL calculation circuit 12 acquires a largest APL value from the APL values of those respective blocks, and multiplies the largest APL value by a peak luminance value, thereby calculating a largest average luminance value. In the present exemplary embodiment, the timing controller 14 controls a light emission luminance and a light emission time of the light emitting device 20 according to the likelihood of occurrence of a flicker, i.e., the largest average luminance value in the example. The control will be described in detail below.

The timing controller 14 transmits gradation data, which is generated by converting the RGB signal into a digital value ordering a voltage, to the source driver 15 of the liquid crystal panel 17. Further, the timing controller 14 transmits a timing signal so as to realize scan at 60 Hz to the gate driver 16. A source electrode and a gate electrode of the liquid crystal panel 17 are driven by the gate driver 16 and the source driver 15, and a not-illustrated common electrode is also driven together therewith, by which a video image is displayed on the screen.

Next, an operation of the light emitting device 20 will be described.

The timing controller 14 outputs a voltage value corresponding to a current set value to be supplied to the LEDs 26 and 27 to the DA converter 21 for setting a current value. For example, to supply 20 mA as the current value when the LEDs 26 and 27 emit light, the timing controller 14 outputs 2V as the voltage value corresponding to the current set value. To supply 4 mA as the current value when the LEDs 26 and 27 emit light, the timing controller 14 outputs 0.4 V as the voltage value corresponding to the current set value.

Further, the timing controller 14 controls a scan operation of the analog switch array 24. The scan operation means control for sequentially shifting an operation of turning on and then turning off an analog switch from upper side to a lower side. An output value is output from the DA converter 21 to each driver 25 by the analog switch being turned on. The timing controller 14 controls a time during which each analog switch remains turned on as the hold time, by which a desired duty ratio can be acquired.

The voltage values under ON/OFF control by the analog switch array 24, which correspond to the respective current set values, are converted by the drivers 25 into current values corresponding to the voltage values, and drive the left-side LEDs 26 and the right-side LEDs 27. The driven LEDs 26 and 27 emit light brightly or darkly depending on the current values. The light from each of the LEDs 26 and 27 is guided by the light guide plate 28 to form a horizontal streak shape, and the front surface of the light guide plate 28 emits light zonally.

In this manner, the video image on the liquid crystal panel 17 is displayed while being illuminated as if it is scanned by the light emitting device 20.

In the present exemplary embodiment, the timing controller 14 controls the current supplied to the LEDs 26 and 27, and controls the hold time, thereby acquiring a same integrated luminance in both bright short light emission and dark long light emission. Desired set values and the like will be described in detail below.

FIGS. 3A1 and 3A2, and FIGS. 3B1 and 3B2 illustrate light emission states of the light emitting device 20 according to the first exemplary embodiment.

FIGS. 3A1 and 3B1 illustrate how light emission states shift according to the passage of time.

FIGS. 3A2 and 3B2 illustrate a relationship between a time and a luminance on a line around a center.

FIG. 3A1 illustrates a shift from a light emission state 41 when a first half of an image is displayed at a low duty ratio to a light emission state 42 when a second half of the image is displayed at the low duty ratio. Further, FIG. 3A1 illustrates bright short light emission 45.

FIG. 3B1 illustrates a shift from a light emission state 43 when the first half of the image is displayed at a high duty ratio to a light emission state 44 when the second half of the image is displayed at the high duty ratio. Further, FIG. 3B1 illustrates dark long light emission 46.

FIG. 3A2 illustrates a luminance change 47 on the line around the center when the image is displayed at the low duty ratio.

FIG. 3B2 illustrates a luminance change 48 on the line around the center when the image is displayed at the high duty ratio.

In FIG. 3A1, a time during which the image is displayed on the liquid crystal panel 17 is from slightly before the light emission state 41 to slightly after the light emission state 42, i.e., a time during which the bright narrow light emission 45 scans the screen from the top to the bottom. On the other hand, in FIG. 3B1, the image is displayed during a time from slightly before the light emission state 43 to slightly after the light emission state 44, i.e., a time during which the dark wide light emission 46 scans the screen from the top to the bottom.

Focusing on horizontally extending one line, light is emitted at a high luminance for a short time for the image at the low duty ratio as the luminance change 47 illustrated in FIG. 3A2. On the other hand, light is emitted at a low luminance for a long time for the image at the high duty ratio as the luminance change 48 illustrated in FIG. 3B2.

The timing controller 14 controls such light emission patterns by the light emitting device 20 according to the likelihood of occurrence of a flicker, by which it becomes possible to provide display maximally responsive to a motion within a range that a flicker unlikely occurs.

Next, a change in a current actually supplied to each of the LEDs 26 and 27 will be described with reference to FIGS. 4A and 4B.

Figure 4B:
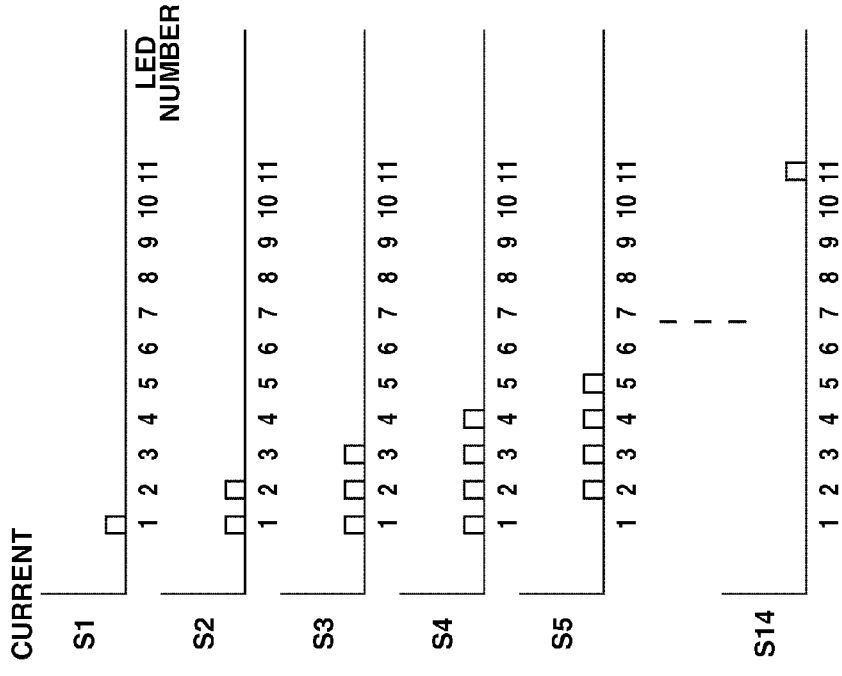
FIGS. 4A and 4B each illustrate a change in currents supplied to light emitting diodes (LEDs).
Figure 4A:
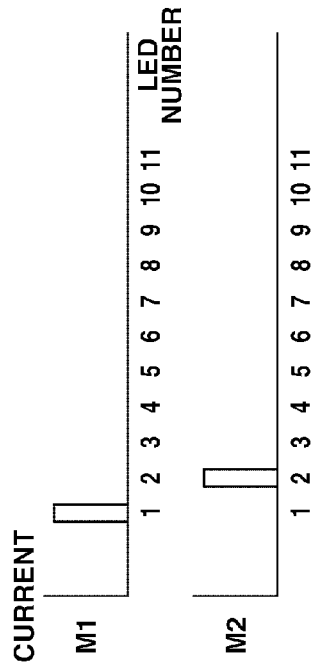

In FIGS. 4A and 4B, numbers of the LEDs 26 and 27 from the top to the bottom (1 to 11) are assigned on the horizontal axis. In the example, for simplification of description, the number of LEDs 26 and 27 are eleven for each of the left and right sides, but the number of the LEDs 26 and 27 further increases for the light emitting device 20 applied to the liquid crystal panel 17 of a large screen. Further, the vertical axis represents a current value.

To cause the LEDs 26 and 27 to emit light brightly for a short time, the current supply is controlled to shift from M1 to M2 to M11 as illustrated in FIG. 4A according to the passage of time.

To cause the LEDs 26 and 27 to emit light darkly for a long time, the current supply is controlled to shift from S1 to S2 to S14 as illustrated in FIG. 4B according to the passage of time.

For a video image of the frame frequency 60 Hz, one cycle corresponds to 16.67 ms.

In M1 illustrated in FIG. 4A, an uppermost LED 1 emits light brightly. After a shift to M2, the LED 1 is turned off, and an LED 2 emits light brightly. The shift continues like sequential scanning downwardly. In M11, a lowermost LED 11 emits light brightly. During a stop period after that, all of the LEDs 1 to 11 are turned off.

In S1 illustrated in FIG. 4B, the uppermost LED 1 emits light darkly. After a shift to S2, the LED 2 also emits light darkly while the LED 1 keeps emitting light. The shift continues with an increase in the number of LEDs emitting light until the shift reaches to S3 and S4. In S5, the LED 1 is turned off, and an LED 5 emits light darkly. In S6 and thereafter, similarly, the current supply shifts in such a manner that one LED is turned off while another LED is turned on. In S14, the current supply is set in such a state that only the lowermost LED 11 emits light. During the stop period after that, all of the LEDs 1 to 11 are turned off.

In this manner, the timing controller 14 controls the current supplied to each of the LEDs 26 and 27 and the hold time of each of the LEDs 26 and 27, by which it becomes possible to realize the light emission patterns of the light emitting device 20 as illustrated in FIGS. 3A1 and 3A2, and FIGS. 3B1 and 3B2. The center of the light emission time needs to be substantially same in phase among the respective frames. This is because, if the center of the light emission time is out of phase, this results in generation of a beat having a low frequency, leading to occurrence of a flicker.

Next, what type of light emission luminance and light emission time are appropriate actually based on a human visual characteristic in control of the light emission luminance and the light emission time according to the likelihood of occurrence of a flicker will be described in detail.

FIGS. 5A, 5B, 5C, and 5D illustrate a method by which the region APL calculation circuit 12 calculates the largest average luminance value among the respective regions.

Figure 5A:
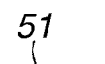
FIGS. 5A, 5B, 5C, and 5D illustrate how to calculate a largest average luminance value among respective regions.
Figure 5B:
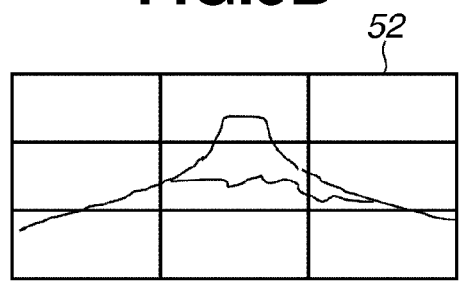
Figure 5C:
Figure 5D:
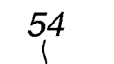

FIG. 5A illustrates a state 51 in which a screen region is divided into blocks. FIG. 5B illustrates an image 52 displayed on the screen. FIG. 5C illustrates APL values 53 of respective divided regions. FIG. 5D illustrates average luminance values 54 of the respective regions.

For simplification of description, the present exemplary embodiment will be described assuming that the screen region is divided into nine blocks as illustrated in FIG. 5A. The number of blocks into which the screen region is divided can be selected in such a manner that an area of one block becomes approximately 50 cm$^2$ to 150 cm$^2$ as will be described below.

In the display apparatus 10, RGB signals as image information corresponding to the image 52 illustrated in FIG. 5B are output from the image quality adjustment circuit 11 to the region APL calculation circuit 12. The region APL calculation circuit 12 calculates an average value of gradations of RGB values for each region to acquire an APL value of each region as illustrated in FIG. 5C. The processing corresponds to an example of processing by an APL value calculation unit.

Next, the region APL calculation circuit 12 multiplies the APL value by the peak luminance to acquire an average luminance value for each region. Assuming that, for example, 200 Cd/m$^2$ is the value of the peak luminance corresponding to a white peak gradation, the region APL calculation circuit 12 acquires the average luminance values illustrated in FIG. 5D. The peak luminance is determined according to the light emitting device 20, and is stored in the region APL calculation circuit 12 in advance.

The region APL calculation circuit 12 calculates a largest average luminance value among the divided regions to acquire the largest average luminance value. The processing corresponds to an example of processing by a largest average luminance value calculation unit. In the example illustrated in FIG. 5D, an average luminance value of a block 5 among the nine blocks is the largest average luminance value, which is 100 Cd/m$^2$ in the example. In the present exemplary embodiment, the largest average luminance value is an example of flicker information that indicates the likelihood of occurrence of a flicker. The timing controller 14 controls the light emission luminance and the light emission time of the light emitting device 20 using the calculated largest average luminance value as will be described below.

FIGS. 6A, 6B, and 6C to FIGS. 9A, 9B, and 9C illustrate results of experiments in which visual characteristics were tested based on subjective evaluations for determining control values of the light emission luminance and the light emission time.

The integrated luminance is the same as a normal luminance, but the term "integrated luminance" is used herein to distinguish it from an instantaneous luminance in the description of the present exemplary embodiment.

The light emission luminance means the instantaneous luminance, and is calculated by dividing the integrated luminance by the ratio of the light emission time (the duty ratio). If the duty ratio is 1, the light emission luminance is equal to the integrated luminance. For example, if the duty ratio is 0.2, the light emission luminance has a value five times the integrated luminance.

Further, the light emission intensity is a value that indicates a ratio, and indicates a ratio relative to a maximum light emission intensity.

The subjective evaluations are five-grade evaluations, and the criteria for respective evaluation levels are set in the following manner.

Subjective Evaluation Values for Flicker in FIGS. 6A, 6B, and 6C, FIGS. 7A, 7B, and 7C, and FIGS. 8A, 8B, and 8C:
5: Do not feel a flicker at all.
4: Slightly feel that there is a flicker.
3: Feel a flicker to a bearable degree.
2: Feel a flicker beyond a bearable degree.
1: Cannot view an image due to a considerable flicker.

Subjective Evaluation Values for Motion Blur in FIGS. 9A, 9B, and 9C:
5: Do not feel a motion blur at all.
4: Slightly feel that there is a motion blur.
3: Feel a motion blur to a bearable degree.
2: Feel a motion blur beyond a bearable degree.
1: Cannot view an image due to a considerable motion blur.

The evaluation levels are set in this manner, whereby the evaluation value 5 is a detection limit, the evaluation value 4 is an acceptable limit, and the evaluation value 3 is a bearable limit. Therefore, as bases for controlling the light emission intensity and the light emission time, it is desirable to control them so as to acquire the evaluation value 4 or higher in principle, and have the evaluation value 3 within a slight range.

Figure 6A:
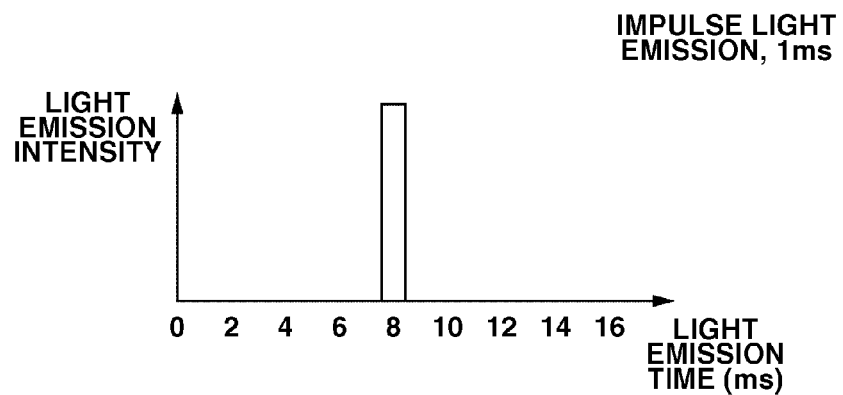
FIGS. 6A, 6B, and 6C illustrate an experiment about a relationship between an area of a display patch and a subjective evaluation of a flicker.
Figure 6B:
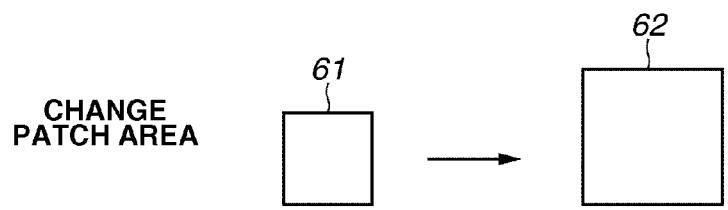
Figure 6C:
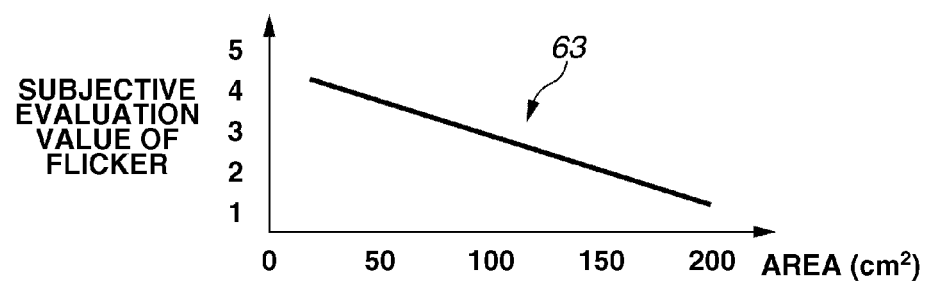

FIGS. 6A, 6B, and 6C illustrate a result of an experiment in which a relationship between an area of a display patch and the subjective evaluation of a flicker was tested. FIG. 6A illustrates a relationship between a light emission time and a light emission intensity of the display. FIG. 6B illustrates a patch 61 having a small area and a patch 62 having a large area. FIG. 6C illustrates a graph 63 that indicates a result of the subjective evaluation.

In the experiment, the light emission intensity and the light emission time were set so as to cause a flicker sufficiently. Since the light emission time was set to 1 ms while the image was displayed at a frame frequency of 60 Hz, the duty ratio was 6%. Further, the light emission intensity was set in such a manner that the integrated luminances of the display patches 61 and 62 became 200 Cd/m$^2$.

Under those display conditions, the patch area was changed from the small patch 61 to the large patch 62, more specifically, approximately from 10 cm$^2$ to 200 cm$^2$. The graph 63 indicates the result of the experiment in which the subjective evaluation was conducted. From the result, areas providing a subjective evaluation value from 2 to 4 were assumed as a range causing a viewer to feel occurrence of a flicker. Therefore, the experiment revealed that it was desirable to employ 50 cm$^2$ to 150 cm$^2$ as an area of one block in block division illustrated in FIG. 5A.

Figure 7A:
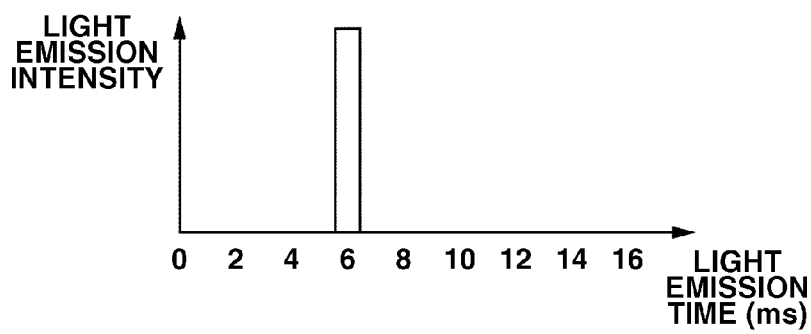
FIGS. 7A, 7B, and 7C illustrate an experiment about a relationship between a luminance of a display patch and the subjective evaluation of a flicker.
Figure 7B:
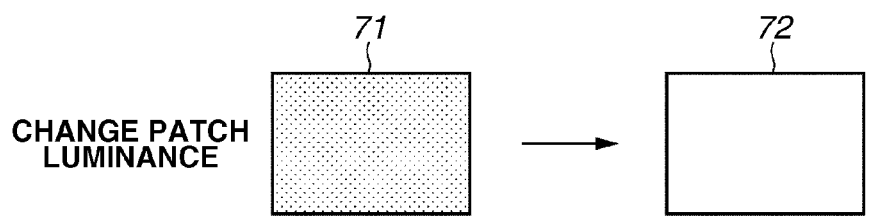
Figure 7C:
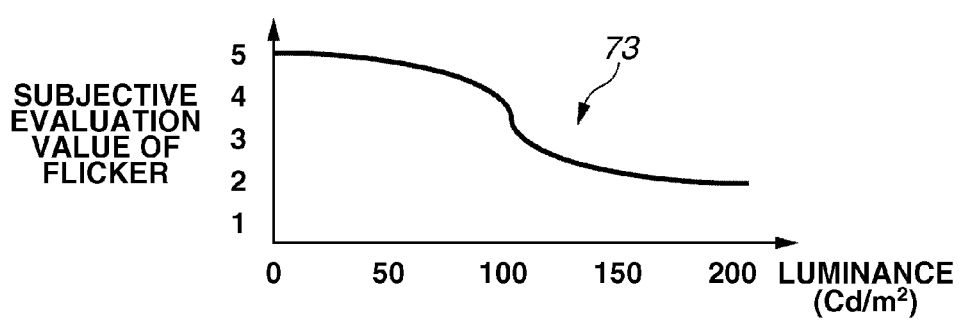

FIGS. 7A, 7B, and 7C illustrate a result of an experiment in which a relationship between a luminance of a display patch and the subjective evaluation of a flicker was tested. FIG. 7A illustrates a relationship between a light emission time and a light emission intensity of the display. FIG. 7B illustrates a dark patch 71 and a bright patch 72. FIG. 7C illustrates a graph 73 that indicates a result of the subjective evaluation.

In the experiment, the light emission intensity and the light emission time were also set so as to cause a flicker sufficiently in a similar manner to FIG. 6A. Further, the areas of the patches 71 and 72 were set to 300 cm$^2$.

Under those display conditions, the luminance of the patch was changed by changing the gradation of the display patch. The gradation was changed in such a manner that the luminance of the patch was changed from the dark patch 71 to the bright patch 72, more specifically, from 0 Cd/m$^2$ to 200 Cd/m$^2$. The graph 73 indicates the result of the experiment in which the subjective evaluation was conducted.

The result revealed that a subjective evaluation value of the acceptable limit 4 or higher was acquired and a flicker was acceptable even with impulse light emission of a low duty ratio at a frame frequency of 60 Hz as long as the luminance was 70 Cd/m$^2$ or lower.

FIGS. 8A, 8B, and 8C illustrate a result of an experiment in which a relationship between a light emission luminance and a light emission time of a display patch and the subjective evaluation of a flicker was tested. FIG. 8A illustrates a patch 80 having a constant gradation and a constant area. FIG. 8B illustrates a relationship between the light emission time and the light emission intensity of the display. FIG. 8B illustrates a light emission state 81 in which light is emitted at a high intensity for a short time, and a light emission state 82 in which light is emitted at a low intensity for a long time. FIG. 8C illustrates a graph 83 that indicates a result of the subjective evaluation.

In the experiment, the area of the patch 80 was set to 300 cm$^2$ so as to cause a flicker sufficiently. The display gradation of the patch 80 was fixed in such a manner that the integrated luminance of the patch 80 was maintained at 200 Cd/m$^2$.

Under those display conditions, the experiment was conducted by changing the light emission intensity and the light emission time while adjusting them in such a manner that the patch maintained the constant integrated luminance. In other words, the light emission state was changed from the light emission state 81 of light emission at the high intensity for the short time to the light emission state 82 of light emission at the low intensity for the long time, more specifically, from a duty ratio of 10% to a duty ratio of 100%. The graph 83 indicates the result of the experiment in which the subjective evaluation was conducted.

The result revealed that a subjective evaluation value of the acceptable limit 4 or higher was acquired with a duty ratio of 70% or higher at a frame frequency of 60 Hz, and a flicker fell within an acceptable range even with a bright luminance.

FIGS. 9A, 9B, and 9C illustrate a result of an experiment in which a relationship between a light emission time of a display patch and the subjective evaluation of a motion blur was tested. FIG. 9A illustrates how a patch 90 is moved. FIG. 9B illustrates a relationship between the light emission time and a light emission intensity of the display. FIG. 9B illustrates a light emission state 91 in which light is emitted at a high intensity for a short time, and a light emission state 92 in which light is emitted at a low intensity for a long time. FIG. 9C illustrates a graph 93 that indicates a result of the subjective evaluation.

Since the present experiment is an evaluation of a motion blur, the gradation was fixed in such a manner that the integrated luminance of the patch 90 was maintained at 50 Cd/m$^2$ so as to prevent a viewer from feeling a flicker.

Under those display conditions, the experiment was conducted by changing the light emission intensity and the light emission time while adjusting them in such a manner that the patch maintained the constant integrated luminance. In other words, the light emission state was changed from the light emission state 91 of light emission at the high intensity for the short time to the light emission state 92 of light emission at the low intensity for the long time, more specifically, from a duty ratio of 10% to a duty ratio of 100%. The graph 93 indicates a result of the experiment in which the subjective evaluation was conducted.

This result revealed that a subjective evaluation value of the acceptable limit 4 or higher was acquired and a motion blur fell within an acceptable range with a duty ratio of 30% or lower at a frame frequency of 60 Hz.

It becomes possible to minimize a motion blur and a flicker by setting, for example, the following control range based on the above-described various types of experiments about the subjective evaluations. The gradation gain is not changed although the settings of the control values are changed, whereby it becomes possible not to sacrifice the gradation of the black portion and the white peak.

The control range is set as follows based on the values acquired from the subjective evaluation.

The area of the block for detecting a flicker is set to 50 to 150 cm$^2$.

A flicker can be accepted if the luminance is 70 Cd/m$^2$ or lower for each block.

A flicker can be accepted if the duty ratio is 70% or higher.

A motion blur can be accepted if the duty ratio is 30% or lower.

Both a flicker and a motion blur are out of the acceptable range if the duty ratio is between 30% to 70%, whereby the light emitting device 20 is controlled in the following manner.

The region APL calculation circuit 12 multiplies the APL value for each region of divided blocks by the peak luminance value to acquire the average luminance value of each region. The region APL calculation circuit 12 sets the largest average luminance value among the respective regions as the largest average luminance value Cd/m$^2$ (hereinafter referred to as a BAM).

Further, assume that the LEDs 26 and 27 to be used can emit light at a maximum value of light emission intensity (hereinafter referred to as an LLM) at a duty ratio of 10%.

(Case 1) If BAM≤70 Cd/m$^2$ is satisfied, a flicker is acceptable, whereby the control values are set in such a manner that a motion blur can fall within the acceptable range.

In other words, the following settings are employed:

DUTY RATIO=FIXED AT 30%

LIGHT EMISSION INTENSITY OF LEDS=FIXED AT $LLM$/3

(Case 2) If BAM≥200 Cd/m$^2$ is satisfied, the duty ratio is set to 70% so that a flicker can fall within the acceptable range.

In other words, the following settings are employed:

DUTY RATIO=FIXED AT 70%

LIGHT EMISSION INTENSITY OF LEDS=FIXED AT $LLM$/7

(Case 3) If 70 Cd/m$^2$<BAM<200 Cd/m$^2$ is satisfied, the duty ratio and the light emission intensity are linearly controlled so that a flicker can fall within the acceptable range (the duty ratio and the light emission intensity may be controlled in a curved manner, instead of being linearly controlled).

In other words, the following settings are employed:

DUTY RATIO=(BAM-70)×0.3+30

LIGHT EMISSION INTENSITY OF LEDS=$LLM$× (10/DUTY RATIO)

Figure 10:
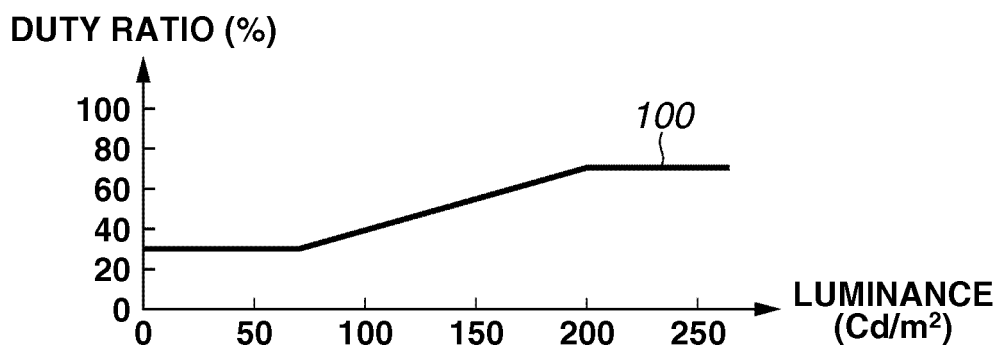
FIG. 10 illustrates a relationship between the largest average luminance value and a duty ratio.
Figure 11:
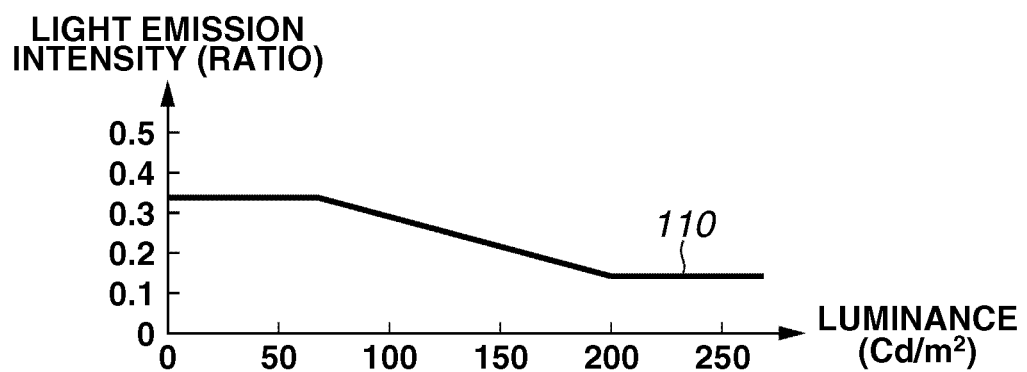
FIG. 11 illustrates a relationship between the largest average luminance value and a light emission intensity.

By converting the above-described control expressions in (Case 1) to (Case 3) into graphs, graphs illustrated in FIGS. 10 and 11 are acquired.

FIG. 10 illustrates a relationship between the largest average luminance value and the duty ratio according to the first exemplary embodiment.

In FIG. 10, the horizontal axis represents the largest average luminance value among the respective regions, and the vertical axis represents the duty ratio of the light emission time. FIG. 10 indicates a control line 100 for determining the duty ratio based on the largest average luminance value.

FIG. 11 illustrates a relationship between the largest average luminance value and the light emission intensity according to the first exemplary embodiment.

In FIG. 11, the horizontal axis represents the largest average luminance value among the respective regions, and the vertical axis represents the ratio of the light emission intensity relative to the maximum light emission intensity. FIG. 11 indicates a control line 110 for determining the ratio of the light emission intensity based on the largest average luminance and the duty ratio.

For example, if BAM=100 $Cd/m^2$ is satisfied, the LEDs 26 and 27 are controlled so as to emit light at a duty ratio of 39.0% and a light emission intensity of a value 0.256 times the maximum value.

In other words, the timing controller 14 acquires the light emission intensity and the duty ratio of the light emission time as the control values by checking the largest average luminance value calculated by the region APL calculation circuit 12 against the control expressions in (Case 1) to (Case 3) or the graphs illustrated in FIGS. 10 and 11. The timing controller 14 controls the light emission luminance of the LEDs 26 and 27 according to the acquired light emission intensity, and controls the duty ratio of the light emission time of the LEDs 26 and 27 according to the acquired duty ratio of the light emission time. For example, the timing controller 14 sets a small value as the light emission luminance of the LEDs 26 and 27 and a large value as the duty ratio of the light emission time of the LEDs 26 and 27 if the largest average luminance value is large, and sets a large value as the light emission luminance of the LEDs 26 and 27 and a small value as the duty ratio of the light emission time of the LEDs 26 and 27 if the largest average luminance value is small. At this time, the timing controller 14 controls the light emission luminance and the duty ratio of the light emission time so as to maintain a constant integrated luminance, which is constituted by the light emission luminance and the light emission time. The light emission luminance and the light emission time of the LEDs 26 and 27 when the largest average luminance value is small is, for example, illustrated in FIG. 3A2. The light emission luminance and the light emission time of the LEDs 26 and 27 when the largest average luminance value is large is, for example, illustrated in FIG. 3B2. Maintaining a constant integrated luminance means that the rectangular area of the luminance change 47 is equal to the rectangular area of the luminance change 48. The timing controller 14 performs such processing for each frame, thereby reducing occurrence of a flicker and a motion blur in a moving image to be displayed. The above-described control expressions in (Case 1) to (Case 3) or the graphs illustrated in FIGS. 10 and 11 are stored in the timing controller 14 in advance.

In this manner, according to the present exemplary embodiment, it is possible to reduce occurrence of a flicker and occurrence of a motion blur by controlling both the light emission luminance and the duty ratio of the light emission time of the light emitting device 20 according to the likelihood of occurrence of a flicker. Especially, the control can be performed with the gain remaining fixed, and, therefore, can provide display without changing the visibility of the low gradation portion and reducing the peak luminance even if the display is provided with a reduced hold time.

The present invention can be applied not only to the above-described first exemplary embodiment but also to different exemplary embodiments having similar structural requirements.

For example, the first exemplary embodiment has been described based on the example in which the light emitting device 20 employs the scan method in which the LEDs 26 and 27 are disposed at the left side and right side of the light guide plate 28. However, exemplary embodiments of the present invention is not limited to this, and can be also carried out in a similar manner, even for the light emitting device 20 using a scan method in which LEDs are disposed directly under the back side of the liquid crystal panel 17 (the direct type). Using the direct type allows the timing controller 14 to independently control respective LED blocks according to luminance distribution of a video image to change the luminance distribution, whereby the method can improve a dynamic contrast. In that case, the timing controller 14 controls both the light emission luminance and the light emission time for each LED.

Further, the first exemplary embodiment has been described based on the example in which the light emitting device 20 employs the scan method. However, exemplary embodiments of the present invention is not limited to this, and can be also carried out in a similar manner, even for the light emitting device 20 using a method in which the whole surface emits light simultaneously, i.e., a method in which the whole backlight surface is turned on and turned off simultaneously. In that case, the timing controller 14 causes all of the left and right LEDs 26 and 27 illustrated in FIG. 1 to emit light simultaneously on the whole surface of the backlight. In that case, the timing controller 14 also controls the LEDs 26 and 27 according to the light emission intensity and the duty ratio of the light emission time acquired based on the above-described control expressions in (Case 1) to (Case 3) or the graphs illustrated in FIGS. 10 and 11. The method that causes the whole surface to emit light simultaneously can be also employed in a similar manner, even for the direct type in which the LEDs are disposed directly under the back side of the liquid crystal panel 17. Further, the method that causes the whole surface to emit light simultaneously can easily control the LEDs, although currents required for the LEDs may concentrate.

Further, an experiment different from the above-described experiments was conducted, the result of which revealed that there was such a visual characteristic that a patch of the duty ratio 30% was more bright than a patch of the duty ratio 70% approximately by 4% even if the patches had a same integrated luminance. Therefore, it is desirable to correct the above-described control expressions in (Case 1) to (Case 3) according to the visual characteristic since the correction can provide visibility of a constant luminance.

The following are corrected control expressions.

(corrected Case 1) If BAM≤70 $Cd/m^2$ is satisfied, the control expressions are the same as the above-described (Case 1):

DUTY RATIO=FIXED AT 30%

LIGHT EMISSION INTENSITY OF LEDS=FIXED AT $LLM/3$ (corrected Case 2) If BAM≥200 $Cd/m^2$ is satisfied, the control expressions are corrected as follows:

DUTY RATIO=FIXED AT 70%

LIGHT EMISSION INTENSITY OF LEDS=$LLM/7 \times 1.04$ (corrected Case 3) If 70 Cd/m² <BAM< 200 Cd/m² is satisfied, the control expressions are corrected as follows:

DUTY RATIO=(BAM−70)×0.308+30

Figure 12:
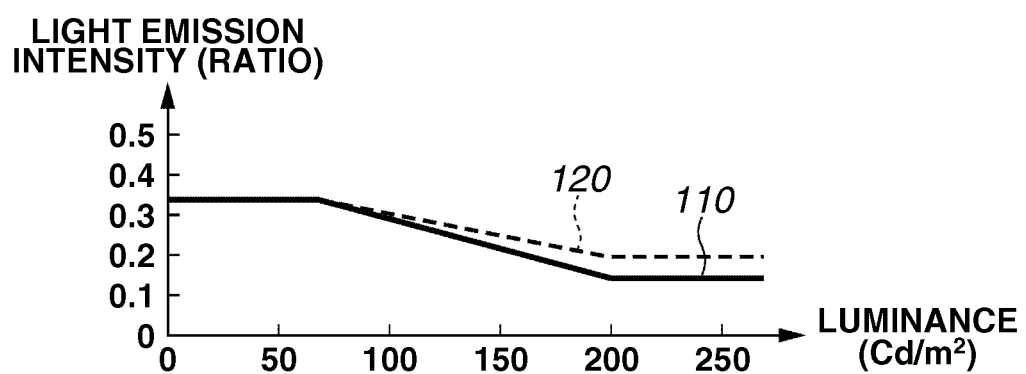
FIG. 12 illustrates a relationship between the largest average luminance value and a corrected light emission intensity.

LIGHT EMISSION INTENSITY OF LEDS=$LLM \times \{(10/\text{DUTY RATIO})+(\text{DUTY RATIO}-30)/1000\}$ By converting the above-described control expressions in (Case 1) to (Case 3) into a graph, a graph illustrated in FIG. 12 is acquired. FIG. 12 illustrates a relationship between the largest average luminance value and the light emission intensity.

In FIG. 12, the horizontal axis represents the largest average luminance value among the respective regions, and the vertical axis represents the ratio of the light emission intensity relative to the maximum light emission intensity. FIG. 12 indicates the control line 110 for determining the ratio of the light emission intensity based on the largest average luminance according to the first exemplary embodiment, and a control line 120 for determining the ratio of the light emission intensity based on the largest average luminance according to the modification.

As a result of the correction, for example, the duty ratio of 39.2% is acquired when BAM is 100 Cd/m², leading to control to cause the LEDs 26 and 27 to emit light at an intensity 0.264 times the maximum value as the light emission intensity. The present example has been described assuming that 4% is used as the correction value, but it is desirable to arrange the display apparatus so as to adjust the correction value, because the correction value slightly varies depending on a viewer. Further, even a correction value that is not exactly 4%, such as a correction value of 1% to 8% and the like, is sufficiently effective.

In the following description, a second exemplary embodiment will be described.

The first exemplary embodiment has been described as the display apparatus 10 including the liquid crystal panel 17. However, the first exemplary embodiment of present invention is not limited thereto, and can be applied to a display apparatus such as a liquid crystal projector, and a display apparatus including a hold-type display device such as an organic electroluminescence (EL) panel.

The second exemplary embodiment will be described as an example in which the light emission luminance and the light emission time are controlled in a liquid crystal projector using LEDs.

The liquid crystal projector can be configured in a substantially similar manner to the first exemplary embodiment by using LED elements as a light source. The second exemplary embodiment is different from the first exemplary embodiment only in that the vertically aligned LEDs so as to form a single line illustrated in FIG. 1 are replaced with a single white LED or RGB LEDs.

In the following description, a third exemplary embodiment will be described.

The third exemplary embodiment will be described as an example in which the light emission luminance and the light emission time are controlled in a liquid crystal projector using a lamp. It is difficult to control a light amount of the lamp little by little by a current value to control the light emission luminance in a similar manner to LEDs in terms of responsiveness. Therefore, in the third exemplary embodiment, the light emission luminance and the light emission time are controlled using a diaphragm.

Figure 13:
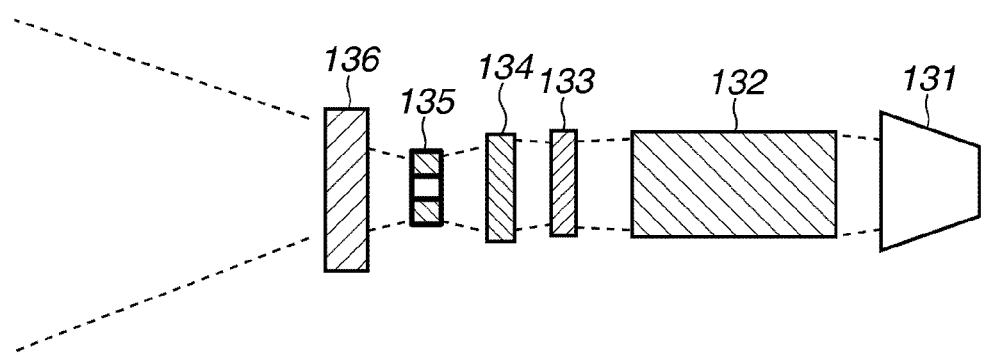
FIG. 13 illustrates an outline of a configuration of a liquid crystal projector according to a third exemplary embodiment.

FIG. 13 illustrates an outline of a configuration of the liquid crystal projector.

In FIG. 13, a lamp 131 servers as a light source. The liquid crystal projector further includes a light concentrating adjustment optical system 132, a transmissive liquid crystal panel 133, a lens 134, a diaphragm 135, and a projection lens 136.

Light emitted from the lamp 131 is concentrated by the light concentrating adjustment optical system 132, and is guided to the liquid crystal panel 133 as collimated light. The light imaged at the liquid crystal panel 133 is guided to the diaphragm 135 through the lens 134, and is reduced according to an opening degree of the diaphragm 135. The reduced light is projected on a not-illustrated screen by the projection lens 136.

FIGS. 14A1 and 14A2, and FIGS. 14B1 and 14B2 illustrate control of the diaphragm 135 of the liquid crystal projector.

FIG. 14A1 illustrates a state 141 in which the diaphragm 135 is opened with a large opening degree for a short time.

FIG. 14A2 illustrates a state 143 in which the opening degree of the diaphragm 135 is large.

FIG. 14B1 illustrates a state 142 in which the diaphragm 135 is opened with a small opening degree for a long time.

FIG. 14B2 illustrates a state 144 in which the opening degree of the diaphragm 135 is small.

In this manner, by changing the opening degree and the opening time of the diaphragm 135, it becomes possible to control both the light emission luminance and the light emission time simultaneously in a similar manner to LEDs even if the liquid crystal projector uses a lamp.

Figure 15:
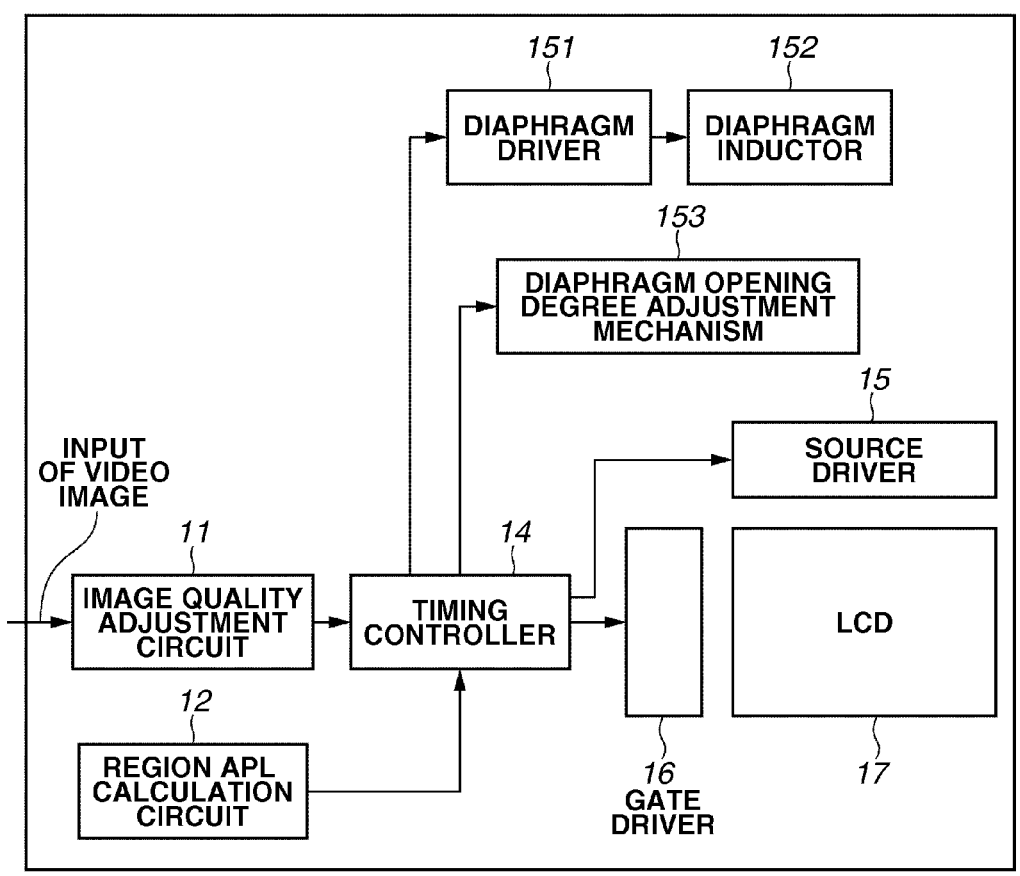
FIG. 15 illustrates an internal configuration of the liquid crystal projector.

FIG. 15 illustrates an internal configuration of the liquid crystal projector. Similar components to the first exemplary embodiment will be identified by the same reference numerals, and descriptions thereof will not be repeated below.

In FIG. 15, the liquid crystal projector includes a diaphragm driver 151 configured to drive the diaphragm 135, a diaphragm inductor 152, and a diaphragm opening degree adjustment mechanism 153.

The likelihood of occurrence of a flicker is detected by the region APL calculation circuit 12 in a similar manner to the first exemplary embodiment. Based on a result of the detection, the timing controller 14 controls both the light emission luminance and the duty ratio of the light emission time in a similar manner to the first exemplary embodiment.

In other words, according to the present exemplary embodiment, due to use of the diaphragm 135, the timing controller 14 adjusts the light emission luminance of the lamp via the diaphragm opening degree adjustment mechanism 153, and controls the light emission time by adjusting a time from opening of the diaphragm 135 to closing of the diaphragm 135 via the diaphragm driver 151 and the diaphragm inductor 152.

In the following description, a fourth exemplary embodiment will be described. The first exemplary embodiment has been described based on the display apparatus 10 including the backlight unit 20. The fourth exemplary embodiment will be described as an exemplary embodiment in which LEDs are arranged by blocks as a structure of the backlight unit. According to the present exemplary embodiment, light emission is controlled in such a manner that each LED block has a different light emission amount, by which it is possible to reduce a halo effect when a dark portion of an image is displayed.

According to the present exemplary embodiment, the gain to a video image is not a fixed gain but a variable gain. This leads to a disadvantage of deterioration of the uniformity in the gradation of the dark portion of the image as described as the problem in "Description of the Related Art", but the variable gain is suitable for viewing of a highly contrasted image since it can reduce the halo effect in the dark portion of the image as described above.

Figure 16:
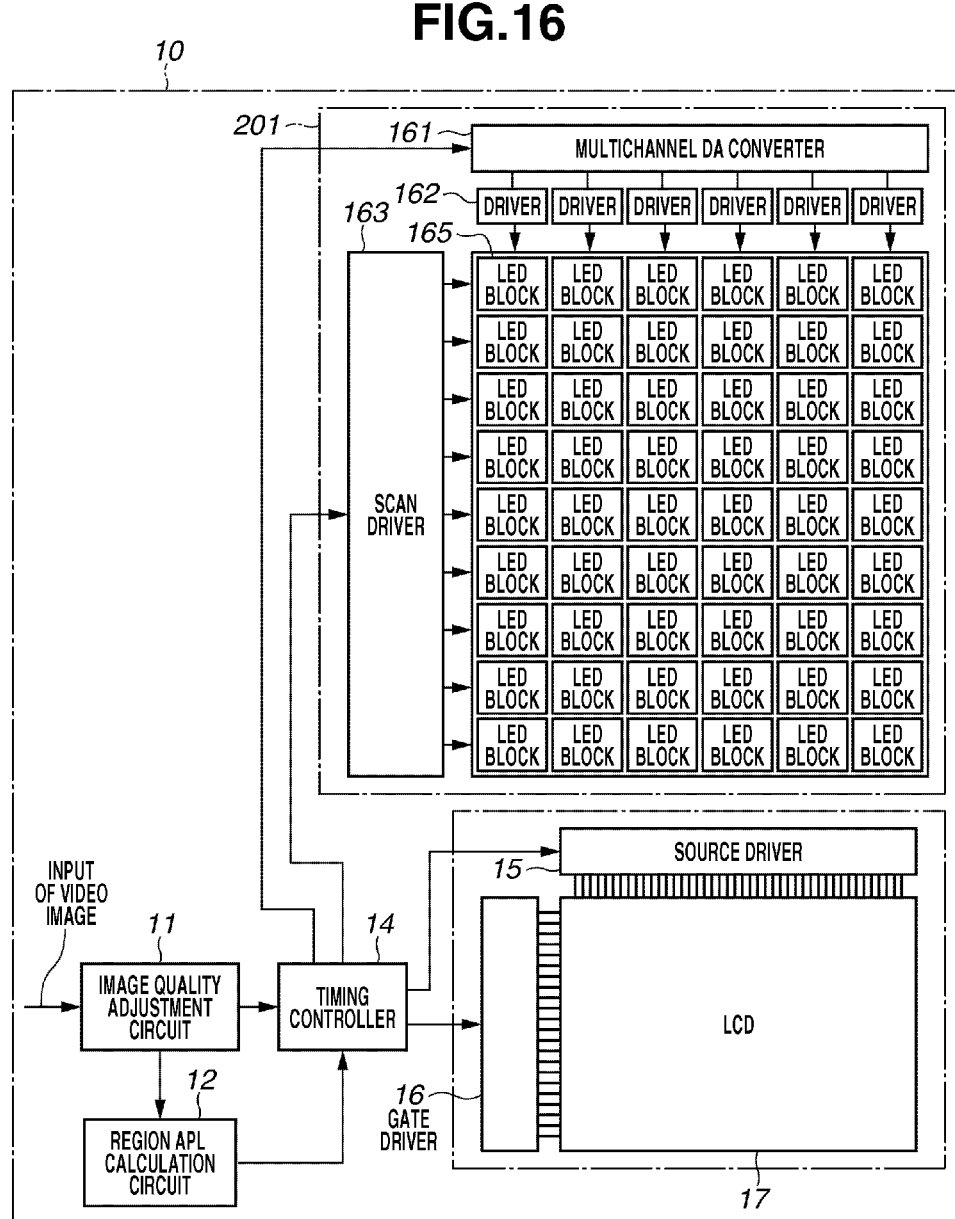
FIG. 16 illustrates an internal configuration of a display apparatus according to a fourth exemplary embodiment.

FIG. 16 illustrates an internal configuration of the display apparatus 10 according to the fourth exemplary embodiment. The display apparatus 10 includes a backlight unit 201 as the light emitting device. The backlight unit 201 realizes light emission of a local dimming method, according to which a plurality of LED blocks is arranged so that each of the LED blocks emits light sequentially from the top while emitting light in a different manner.

In FIG. 16, the components 11, 12, 14, 15, 16, and 17 are similar to those illustrated in FIG. 1, whereby descriptions thereof will not be repeated below, although differences according to the following operation of the backlight unit 201 will be described separately. A multichannel DA converter 161 determines light emission amounts of the LED blocks, and has a plurality of voltage outputs. FIG. 16 illustrates an example in which the plurality of voltage outputs are six channels. A driver 162 drives an LED, and the number of drivers 162 corresponds to the total number of LED blocks 165. Each driver 162 has a latch function, and latches a voltage output of the multichannel DA converter 161, thereby outputting a current proportional to a voltage. A scan driver 163 switches ON/OFF states of the LEDs. The scan driver 163 does not necessarily turn on only the LEDs arranged in a horizontal one row sequentially, but may activate a plurality of rows to turn them on simultaneously as will be described below. The LED blocks 165 are arranged in a matrix form. LED blocks 11 to 61 are arranged from the upper left end to the upper right end, and LED blocks 11 to 19 are arranged from the upper left end to the lower left end. The LED blocks 165 are constituted by fifty-four LED blocks in total from the upper left block 11 to the lower right block 69.

Regarding an LED configuration in each block, each block may be constituted by a single white LED or a plurality of white LEDs. Alternatively, each block may be constituted by LEDs of three colors of RGB.

An outline of an operation of the display apparatus 10 is substantially similar to FIG. 1, and, therefore, a description thereof will not be repeated below, although differences according to the following operation of the backlight unit 201 will be described.

The region APL calculation circuit 12 divides the display region into fifty-four blocks corresponding to the number of LED blocks according to the screen size of the liquid crystal panel 17, and calculates the APL value for each of the blocks.

The region APL calculation circuit 12 calculates the average luminance value by multiplying the APL value of each block by the peak luminance value. According to the present exemplary embodiment, the timing controller 14 controls the light emission luminance and the light emission time of the backlight unit 201 according to the average luminance value that indicates the likelihood of occurrence of a flicker. The control will be described in detail below.

The timing controller 14 transmits gradation data, which is generated by converting an RGB signal into a digital value ordering a voltage, to the source driver 15 of the liquid crystal panel 17.

At this time, the timing controller 14 multiplies the gradation data by a value corresponding to a ratio of a light emission luminance value for each block (hereinafter abbreviated as a luminance ratio) as a measure to realize local dimming.

For example, if an LED block has a luminance ratio of 0.8, the timing controller 14 multiplies the gradation data by 1.25, which is the inverse of the luminance ratio. As a result, it is possible to maintain a display luminance regardless of the luminance ratio of each LED block.

Next, an operation of the backlight unit 201 will be described. The timing controller 14 outputs a voltage value corresponding to a current set value to be supplied to each LED block, to the multichannel DA converter 161 for setting the current value.

For example, to supply 20 mA as the current value at the time of light emission of an LED block, the timing controller 14 outputs 2 V as the voltage value corresponding to the current set value. To supply 4 mA as the current value at the time of light emission, the timing controller 14 outputs 0.4 V as the voltage value corresponding to the current set value.

The driver 162 receives the voltage from the multichannel DA converter 161 and latches the voltage value, thereby maintaining a constant current output during display of a sub-frame.

Further, the timing controller 14 controls a scan operation of the scan driver 163. The scan operation means control for sequentially shifting an operation of turning on and then turning off an LED block to a lower-side analog switch. Each LED block emits light with brightness according to the voltage value latched by the driver 162 by turning on the scan driver 163. The present scan operation is performed not only on a horizontal single block row but also on a plurality of block rows. The timing controller 14 controls a time during which each output line of the scan driver 163 remains turned on as the hold time, thereby turning on a single block row or a plurality of block rows simultaneously to acquire a desired duty ratio.

In this manner, a video image on the liquid crystal panel 17 is displayed while being illuminated as if it is scanned by the backlight unit 201 block by block. According to the present exemplary embodiment, the timing controller 14 controls the current to be supplied to each LED block and controls the hold time. Desired set values and the like will be described in detail below.

Next, a change in a current actually supplied to each LED block will be described with reference to FIGS. 17A1, 17A2, and 17A3, and FIGS. 17B1, 17B2, and 17B3. In FIG. 16, the LED blocks are numbered as 11 to 69 from the upper left block to the lower right block.

In the present example, for simplification of description, the number of LED blocks is fifty-four. However, the number of LED blocks further increases for the backlight unit 201 used for the liquid crystal panel 17 of a large screen. Further, the vertical axis represents a current value.

In the present exemplary embodiment, basically, the current supply is also controlled to shift in a similar manner to M1, M2 to M11 illustrated in FIG. 4A according to the passage of time if the LEDs emit light brightly for a short time as described with reference to FIG. 4A. The current supply is controlled to shift in a similar manner to S1, S2 to S14 illustrated in FIG. 4B according to the passage of time if the LEDs emit light darkly for a long time.

A difference from the first exemplary embodiment is that the light emission amount is controlled for each LED block. As the light emission amount, a brighter sub-frame M has, for example, two types, i.e., a strong pattern and a weak pattern, and a proportion of the weak pattern to the strong pattern is, for example, one-fourth. As the current amount, there are two types, i.e., 20 mA and 5 mA. Further, a darker sub-frame S has two types, i.e., a weak pattern and a zero pattern as the light emission amount. As the current amount, there are two types, i.e., 2 mA and 0 mA. If the 0 value is difficult to be realized as the light emission amount, an extremely small light emission amount may be used for the zero pattern. These patterns are illustrated as light emission amounts 177 to 180 illustrated in FIGS. 17A2 and 17A3, and FIGS. 17B2 and 17B3. The light emission amount 177 indicates the strong pattern of the sub-frame M. The light emission amount 178 indicates the weak pattern of the sub-frame M. The light emission amount 179 indicates the weak pattern of the sub-frame S. The light emission amount 180 indicates the zero pattern of the sub-frame S.

The light emission patterns of the sub-frame M and the sub-frame S are changed based on an average luminance value of each LED block and a largest gradation value in the block acquired by the region APL calculation circuit 12.

If a high value is acquired as the block average luminance value and a high value is acquired as the largest gradation value among pixels in the block, the LEDs in that block emit light according to the strong pattern 177 of the sub-frame M and the weak pattern 179 of the sub-frame S.

If a high value is acquired as the block average luminance value and a low value is acquired as the largest gradation value among pixels in the block, the LEDs in that block emit light according to the weak pattern 178 of the sub-frame M and the weak pattern 179 of the sub-frame S.

If a low value is acquired as the block average luminance value and a high value is acquired as the largest gradation value among pixels in the block, the LEDs in that block emit light according to the strong pattern 177 of the sub-frame M and to emit no light according to the sub-frame S.

If a low value is acquired as the block average luminance value and a low value is acquired as the largest gradation value among pixels in the block, the LEDs in that block emit light according to the weak pattern 178 of the sub-frame M and to emit no light according to the sub-frame S.

The above description is outlined as follows. Whether light is emitted according to the weak pattern of the sub-frame S or no light is emitted according to the sub-frame S is determined based on the block average luminance value. Whether light is emitted according to the strong pattern or the weak pattern of the sub-frame M is determined based on the largest gradation value.

Having described the present exemplary embodiment assuming that there are four types of light emission patterns for simplification of description, but the light emission patterns may be more complicated. In that case, the complicated patterns can be dealt with by increasing the number of divisions between a high side and a low side of the block average luminance value, and increasing the number of divisions between a high side and a low side of the largest gradation value.

As viewed from the whole backlight unit 201, a state 171 in FIG. 17A1 indicates the state M2. At this time, the LED blocks 21, 22, and 25 emit light by the light emission amount according to the weak pattern of the sub-frame M, and the LED blocks 23 and 24 emit light by the light emission amount according to the strong pattern of the sub-frame M. The LED block 26 does not emit light. Similarly, a state 172 in FIG. 17A1 indicates the state M8. At this time, the LED blocks 83 and 86 emit light by the light emission amount according to the weak pattern of the sub-frame M, and the LED blocks 84 and 85 emit light by the light emission amount according to the strong pattern of the sub-frame M. The LED blocks 81 and 82 do not emit light.

In a state 173 illustrated in FIG. 17B1, the LED blocks 13, 14, 23, 24, 34, 35, 43, 44, and 45, i.e., 9 blocks in total simultaneously emit light by the light emission amount according to the weak pattern of the sub-frame S. Similarly, a state 174 in FIG. 17B1 corresponds to the state S9. At this time, the LED blocks 63, 64, 74, 75, 84, 85, 93, and 94, i.e., 8 blocks in total simultaneously emit light by the light emission amount according to the weak pattern of the sub-frame S.

For a video image at the frame frequency 60 Hz, one cycle corresponds to 16.67 ms.

In this manner, the timing controller 14 controls currents to be supplied to the LEDs and times during which the LEDs remain turned on, by which it becomes possible to realize the light emission patterns of the backlight unit 201 illustrated in FIGS. 17A1, 17A2, and 17A3, and FIGS. 17B1, 17B2, and 17B3.

The present exemplary embodiment controls the LEDs in such a manner that each independent LED block on the display region has a different light emission amount, and, therefore, can prevent occurrence of a flicker and leave a moving portion as an image having a natural motion blur while providing display of an image black portion with a halo effect reduced therefrom.

In the following description, a fifth exemplary embodiment will be described. The fourth exemplary embodiment has been described as the display apparatus 10 including the backlight unit 201 having the plurality of LED blocks. The fifth exemplary embodiment will be described as a display apparatus that generates an intermediate image and displays an image at a frequency twice the original image. The display apparatus according to the fifth exemplary embodiment is a display apparatus 101.

FIG. 18 illustrates an internal configuration of the display apparatus 101 according to the fifth exemplary embodiment. The display apparatus 101 includes the light emitting device (backlight device) 201. The light emitting device 201 operates based on the local dimming method, according to which a plurality of LED blocks is arranged and the respective blocks sequentially emit light from the top while providing different light emission for each block.

The components 11, 12, 14, 15, 16, and 17 in the display apparatus 101 are similar to those illustrated in FIG. 1, and, therefore, descriptions thereof will not be repeated below. An intermediate image generation circuit 181 generates an intermediate image from an original image. A frame buffer 182 is a memory connected to the intermediate image generation circuit 181.

The intermediate image generation circuit 181 uses two adjacent original images of 60 Hz to generate an intermediate image, which corresponds to an intermediate therebetween, and outputs it as the image of 120 Hz. To use two original images, the intermediate image generation circuit 181 stores an old image in the frame buffer 182, and generates an intermediate image from a new image and the read old image. The technique for generating the intermediate image is a common technique, and, therefore, a detailed description thereof is omitted herein.

Since the intermediate image is generated by calculating a motion amount and the like, the intermediate image has a deteriorated image quality especially in a moving portion compared to the original images. Displaying the intermediate image between the original images without any correction made thereto leads to display of an uncomfortable motion blur and the like, thereby causing a viewer to feel as if the image is disturbed.

Therefore, the present fifth exemplary embodiment provides dark long light emission to the intermediate image in a block having a high average luminance value by the backlight unit 201 while providing display at 120 Hz using the intermediate image. This results in blurring of a deteriorated portion in the intermediate image, which may occur in a moving portion, whereby the viewer hardly feels the disrupted feeling. In this manner, the present exemplary embodiment eliminates the disrupted feeling due to the uncomfortable motion blur in the moving portion while preventing occurrence of a flicker.

Further, the present exemplary embodiment reduces a bright short light emission intensity, which is set to the original images, in a block having a small largest gradation value by the backlight unit 201. As a result, it is possible to display an image in which a dark portion is viewed as a black and sharp image.

Therefore, according to the present exemplary embodiment, when the display apparatus 101 provides display at 120 Hz using the intermediate image, it is possible to display a moving portion as an image keeping the image quality with less deterioration while the display apparatus 101 reduces only a flicker in a bright portion and provides display of a dark portion in the image with a halo effect reduced therefrom.

Having described the various exemplary embodiments of the present invention, exemplary embodiments of the present invention is not limited to only these exemplary embodiments, and can be modified and the like within the scope of the present invention.

For example, the light emitting device 20 may include the image equality adjustment circuit 11, the region APL calculation circuit 12, the timing controller 14, and the like.

Further, the exemplary embodiments of the present invention can be also carried out by performing the following procedure. The procedure includes supplying a program capable of realizing the functions of the above-described exemplary embodiments to the display apparatus 10 or the light emitting device 20 via a network or any of various types of storage media, and causing a computer (or a central processing unit (CPU) or the like) of the display apparatus 10 or the light emitting device 20 to read and execute the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-228954 filed Oct. 16, 2012, which is hereby incorporated by reference herein in its entirety.

What is claimed is:

1. A display apparatus that displays an image by causing a light emitting device to emit light, the display apparatus comprising:
a detection unit configured to detect flicker information that indicates a likelihood of occurrence of a flicker based on input image information, the flicker information calculated based on an average picture level (APL) value by averaging gradation numbers based on the input image information for each of a plurality of regions corresponding to blocks into which an image display region is divided; and
a control unit configured to control both of a light emission luminance and a duty ratio of a light emission time of the light emitting device according to the flicker information detected by the detection unit.

2. The display apparatus according to claim 1, wherein the control unit performs, according to the flicker information detected by the detection unit, one of:
control in such a manner that the light emission luminance of the light emitting device has a large value and the duty ratio of the light emission time of the light emitting device has a small value, and control in such a manner that the light emission luminance of the light emitting device has a small value and the duty ratio of the light emission time of the light emitting device has a large value.

3. The display apparatus according to claim 1, wherein the control unit controls both of the light emission luminance and the duty ratio of the light emission time of the light emitting device so as to maintain a constant integrated luminance, which is constituted by the light emission luminance and the light emission time of the light emitting device, according to the flicker information detected by the detection unit.

4. The display apparatus according to claim 1,
wherein the detection unit detects, based on the input image information, a region in which the flicker most likely occurs among a plurality of regions corresponding to blocks into which an image display region is divided, and
wherein the control unit controls both the light emission luminance and the duty ratio of the light emission time of the light emitting device, based on the flicker information of the region in which the flicker most likely occurs.

5. The display apparatus according to claim 1,
wherein the detection unit includes a largest average luminance value calculation unit configured to calculate a largest average luminance value among values calculated by multiplying the APL values calculated by the APL value calculation unit by a peak luminance, as a largest average luminance value, and
wherein the flicker information is the largest average luminance value calculated by the largest average luminance value calculation unit.

6. The display apparatus according to claim 5,
wherein the control unit performs control in such a manner that the light emission luminance of the light emitting device has a small value and the duty ratio of the light emission time of the light emitting device has a large value if the largest average luminance value calculated by the largest average luminance value calculation unit is large, and performs control in such a manner that the light emission luminance of the light emitting device has a large value and the duty ratio of the light emission time of the light emitting device has a small value if the largest average luminance value is small, and wherein the control unit controls both the light emission luminance and the duty ratio of the light emission time of the light emitting device so as to maintain a constant integrated luminance, which is constituted by the light emission luminance and the light emission time of the light emitting device.

7. The display apparatus according to claim 6, wherein the control unit makes a correction such that the light emission luminance of the light emitting device increases according to an increase in the largest average luminance value calculated by the largest average luminance value calculation unit.

8. The display apparatus according to claim 1,
wherein the light emitting device is a backlight device including a plurality of LEDs arranged so as to form at least one row at a back side of a liquid crystal panel, and
wherein the control unit causes the plurality of LEDs to emit light in an order that the plurality of LEDs are arranged in.

9. The display apparatus according to claim 1,
wherein the light emitting device is a backlight device including a plurality of LEDs arranged directly under a back side of a liquid crystal panel, and
wherein the control unit causes the plurality of LEDs to emit light independently.

10. The display apparatus according to claim 1,
wherein the light emitting device is a backlight device including one of a plurality of LEDs arranged so as to form at least one row at a back side of a liquid crystal panel and a plurality of LEDs arranged directly under the back side of the liquid crystal panel, and
wherein the control unit causes the plurality of LEDs to emit light over a whole surface simultaneously.

11. The display apparatus according to claim 1,
wherein the display apparatus is a liquid crystal projector, and
wherein the control unit controls both the light emission luminance and the duty ratio of the light emission time of the light emitting device via a diaphragm.

12. A light emitting device that allows display of an image by causing a light emitting unit to emit light, the light emitting device comprising:

a detection unit configured to detect flicker information that indicates a likelihood of occurrence of a flicker based on input image information, the flicker information calculated based on an average picture level (APL) value by averaging gradation numbers based on the input image information for each of a plurality of regions corresponding to blocks into which an image display region is divided; and
a control unit configured to control both of a light emission luminance and a duty ratio of a light emission time of the light emitting unit according to the flicker information detected by the detection unit.

13. A method for controlling a display apparatus that displays an image by causing a light emitting device to emit light, the method comprising:
detecting flicker information that indicates a likelihood of occurrence of a flicker based on input image information, the flicker information calculated based on an average picture level (APL) value by averaging gradation numbers based on the input image information for each of a plurality of regions corresponding to blocks into which an image display region is divided; and
controlling both a light emission luminance and a duty ratio of a light emission time of the light emitting device according to the detected flicker information.

14. A computer-readable storage medium containing computer-executable instructions for controlling a display apparatus that displays an image by causing a light emitting device to emit light, the computer-executable instructions comprising:
detecting flicker information that indicates a likelihood of occurrence of a flicker based on input image information, the flicker information calculated based on an average picture level (APL) value by averaging gradation numbers based on the input image information for each of a plurality of regions corresponding to blocks into which an image display region is divided; and
controlling both a light emission luminance and a duty ratio of a light emission time of the light emitting device according to the flicker information detected.

* * * * *